United States Patent
Wang et al.

(10) Patent No.: US 11,798,121 B2
(45) Date of Patent: Oct. 24, 2023

(54) TILE-BASED GRAPHICS PROCESSING SYSTEMS

(71) Applicant: Arm Limited, Cambridge (GB)

(72) Inventors: Jian Wang, Skane (SE); Toni Viki Brkic, Staffanstorp (SE)

(73) Assignee: Arm Limited, Cambridge (GB)

( * ) Notice: Subject to any disclaimer, the term of this patent is extended or adjusted under 35 U.S.C. 154(b) by 19 days.

(21) Appl. No.: 17/648,898

(22) Filed: Jan. 25, 2022

(65) Prior Publication Data

US 2022/0277411 A1    Sep. 1, 2022

(30) Foreign Application Priority Data

Jan. 28, 2021  (GB) ..................................... 2101172

(51) Int. Cl.
| | |
|---|---|
| *G06T 1/20* | (2006.01) |
| *G06T 15/00* | (2011.01) |
| *G06T 15/50* | (2011.01) |
| *G06T 17/10* | (2006.01) |

(52) U.S. Cl.
CPC .............. *G06T 1/20* (2013.01); *G06T 15/005* (2013.01); *G06T 15/503* (2013.01); *G06T 17/10* (2013.01)

(58) Field of Classification Search
CPC ....... G06T 1/20; G06T 15/005; G06T 15/503; G06T 17/10
See application file for complete search history.

(56) References Cited

U.S. PATENT DOCUMENTS

| | | | |
|---|---|---|---|
| 2013/0034309 A1 | 2/2013 | Nystad et al. | |
| 2013/0141445 A1* | 6/2013 | Engh-halstvedt | ....... G06T 5/002 345/506 |
| 2014/0368521 A1* | 12/2014 | Lassen | .................. G06T 15/005 345/530 |
| 2015/0062154 A1* | 3/2015 | Ellis | ...................... G06T 15/005 345/619 |
| 2019/0108610 A1* | 4/2019 | Flordal | ................... G06T 11/40 |
| 2020/0202594 A1* | 6/2020 | Saleh | ..................... G06T 11/40 |

OTHER PUBLICATIONS

Combined Search and Examination Report dated Jul. 12, 2021, GB Patent Application No. GB2101172.1.

* cited by examiner

*Primary Examiner* — Sing-Wai Wu
*Assistant Examiner* — Khoa Vu
(74) *Attorney, Agent, or Firm* — Vierra Magen Marcus LLP

(57) ABSTRACT

A method of operating a tile-based graphics processing pipeline, in which the pipeline maintains information indicating whether sample values of rendered fragment data stored in the tile buffer for a set of plural pixels (or for each set of a plurality of sets of plural pixels) have the same value.

19 Claims, 7 Drawing Sheets

TILE-BASED GRAPHICS PROCESSING SYSTEMS

CROSS-REFERENCE TO RELATED APPLICATIONS

This application claims priority pursuant to 35 U.S.C. 119(a) to United Kingdom Patent Application No. 2101172.1, filed Jan. 28, 2021, which application is incorporated herein by reference in its entirety.

BACKGROUND

The technology described herein relates to the processing of computer graphics, and in particular to a method of operating a graphics processor.

Graphics processing is normally carried out by first splitting a scene (e.g. a 3D model) to be displayed into a number of similar basic components or "primitives", which primitives are then subjected to the desired graphics processing operations. The graphics "primitives" are usually in the form of simple polygons, such as triangles.

Once primitives and their vertices have been generated and defined, they can be further processed by a fragment processing pipeline, in order to generate the desired graphics processing output (render output), such as a frame for display.

This usually involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rendering process involves deriving the data, such as red, green and blue (RGB) colour values and an "alpha" (transparency) value, necessary to represent the primitive at the sample points. Where necessary, newly generated data may be blended with data that has previously been generated for the sampling point in question.

In tile-based rendering, the render output, e.g., frame to be displayed, is divided into a plurality of smaller sub regions, usually referred to as "tiles". Each tile is rendered separately (typically one after another), and the rendered tiles are then recombined to provide the complete render output, e.g., frame for display.

A tile-based graphics processing pipeline will include one or more so-called tile buffers that store rendered fragment data at the end of the pipeline until a given tile is completed and written out to an external memory, such as a frame buffer, for use. In some tile-based graphics processing pipelines, the rendered fragment data is compressed before being written out to the external memory.

The Applicants believe that there remains scope for improvements to graphics processors and to graphics processing.

BRIEF DESCRIPTION OF THE DRAWINGS

Various embodiments of the technology described herein will now be described by way of example only and with reference to the accompanying drawings, in which.

Like reference numerals are used for like elements throughout the figures, where appropriate.

DETAILED DESCRIPTION

Figure 1:
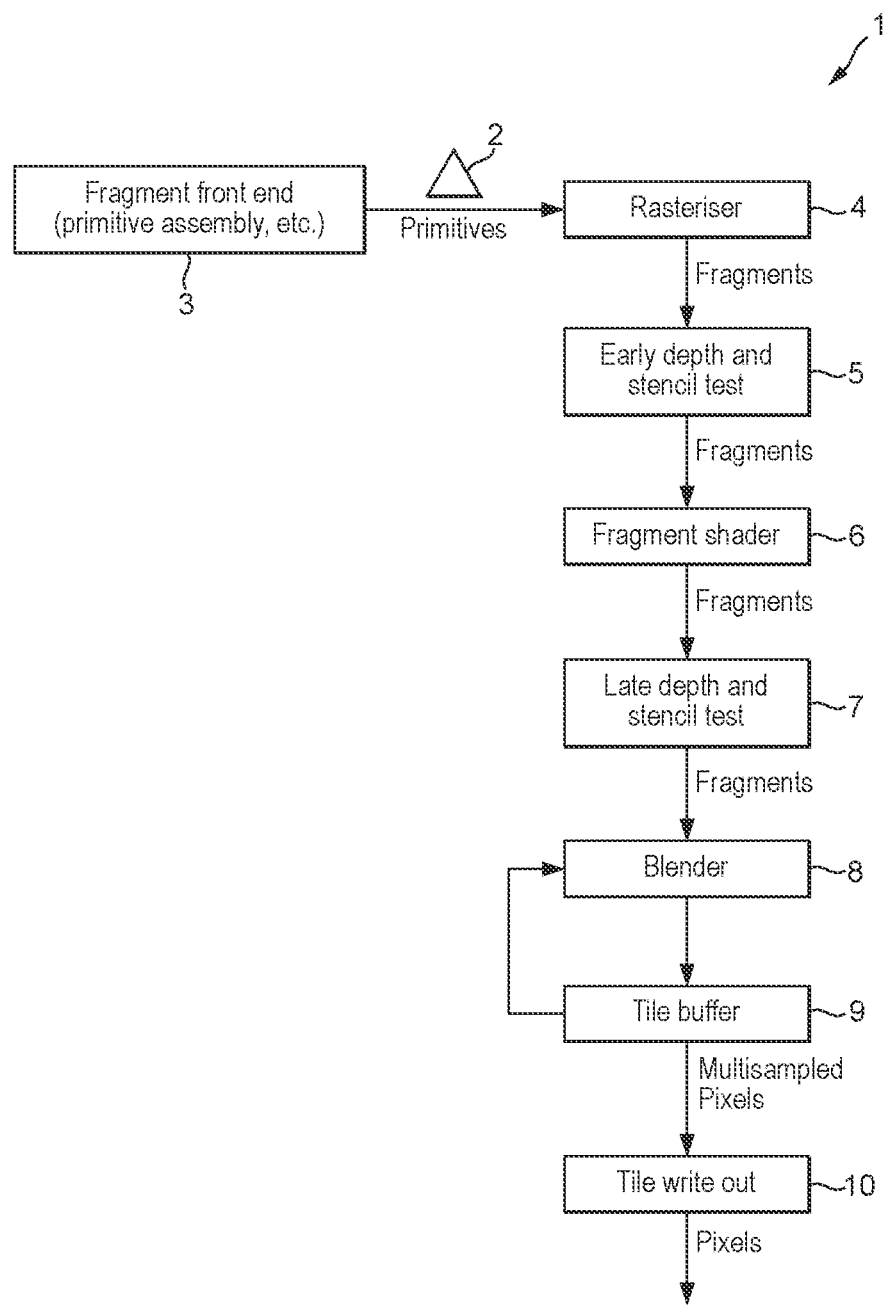
FIG. 1 shows schematically a graphics processing pipeline in accordance with an embodiment.

A first embodiment of the technology described herein comprises a method of operating a tile-based graphics processing pipeline that comprises:
  a plurality of processing stages, including at least a rasteriser that rasterises input primitives to generate graphics fragments to be processed, and a renderer that processes fragments generated by the rasteriser to generate rendered fragment data; and
  a tile buffer configured to store rendered fragment data locally to the graphics processing pipeline prior to that data being written out to an external memory, wherein the tile buffer is configured to store rendered fragment data for an array of sample positions, with each sample position of the array of sample positions having a sample value associated with it, and each sample position or group of sample positions of the array of sample positions corresponding to an output pixel of an array of output pixels;
the method comprising:
  maintaining, in association with the tile buffer, in respect of one or more sets of plural pixels of the array of output pixels, information indicating whether all of the sample positions for that set have the same sample value; and
  using the information to control use of the rendered fragment data stored in the tile buffer.

A second embodiment of the technology described herein comprises a tile-based graphics processing pipeline comprising:
  a plurality of processing stages, including at least a rasteriser that rasterises input primitives to generate graphics fragments to be processed, and a renderer that processes fragments generated by the rasteriser to generate rendered fragment data; and
  a tile buffer configured to store rendered fragment data locally to the graphics processing pipeline prior to that data being written out to an external memory, wherein the tile buffer is configured to store rendered fragment data for an array of sample positions, with each sample position of the array of sample positions having a sample value associated with it, and each sample position or group of sample positions of the array of sample positions corresponding to an output pixel of an array of output pixels;

wherein the pipeline is configured to:
maintain, in association with the tile buffer, in respect of one or more sets of plural pixels of the array of output pixels, information indicating whether all of the sample positions for that set have the same sample value; and use the information to control use of the rendered fragment data stored in the tile buffer.

Embodiments are directed to a method of operating a tile-based graphics processing pipeline, in which the pipeline maintains information indicating whether sample values of rendered fragment data stored in the tile buffer for a set of plural pixels (or for each set of a plurality of sets of plural pixels) have the same value. In other words, the pipeline is configured to track the equivalence of set(s) of plural pixels.

The Applicant has recognised that maintaining (tracking) this information at the granularity of sets of plural output pixels can be particularly useful for controlling use of the data in various circumstances.

In particular, the information can be used to control the writing out of the rendered fragment data from the tile buffer to the external memory, e.g. such that only a single output (pixel) value is output for a set of plural pixels when the information indicates that all of the sample positions for that set have the same sample value. This single pixel value can then be duplicated in the external memory for each of the plural pixels of the set, as appropriate.

Additionally or alternatively, where the rendered fragment data is compressed before being written out to the external memory, the information can be used to control the compression. In particular, some operations that the compressor would normally perform can be skipped or speeded up where the compressor knows, based on the information, that all of the sample positions for a set have the same sample value.

Equally, the information can be used to control blending of newly generated rendered fragment data with previously generated rendered fragment data stored in the tile buffer, e.g. such that only a single blend operation is performed for all of the sample positions within a set when the information indicates that all of the sample positions for the set have the same sample value (and when the newly generated rendered fragment data has the same value for all of the sample positions within the set). The single blended value can then be stored in the tile buffer for the set, as appropriate.

Thus, various embodiments can reduce the number of operations (e.g. read, write, blend, and/or compression operations) required when processing graphics data for display. The overall effect of this is that the bandwidth and/or power requirements of the graphics processing pipeline, and therefore the overall graphics processing system, can be beneficially reduced.

It will be appreciated, therefore, that various embodiments provide an improved graphics processing pipeline.

The graphics processing pipeline may be implemented in any suitable manner. The graphics processing pipeline may form part of or may be executed by a graphics processor. The graphics processor may be part of an overall graphics processing system that includes a host processor that executes applications that can require graphics processing by the graphics processing pipeline of the graphics processor.

The graphics processing pipeline (and the graphics processor) should be (and in embodiments is) configured to generate a render output, i.e. in the form of an array of output pixels. The render output may comprise any suitable render output, such as frame for display, or render to texture output, etc. In embodiments, the render output is an output frame in a sequence of plural output frames that the graphics processing pipeline generates. Each output frame may be generated in the manner of various embodiments.

The render output comprises an array of output pixels (i.e. data elements), for each of which appropriate render output data (e.g. a set of colour value data) is generated. The data may comprise, for example, a set of red, green and blue, RGB values and a transparency (alpha, a) value.

The graphics processing pipeline (and the graphics processor) should be (and in embodiment is) configured to store the render output (i.e. the array of output pixels) in an external memory. The external memory may be any suitable memory such as a main memory of the graphics processing system. The external memory is external to the graphics processor (or graphics processing unit (GPU)) that is configured to execute the graphics processing pipeline, i.e. comprises a separate integrated circuit (chip). The render output (array of output pixels) may be stored in a frame buffer provided in the external (main) memory.

The graphics processing pipeline may comprise any suitable tile-based graphics processing pipeline configured to generate a render output (array of output pixels). The graphics processing pipeline may in general comprise a vertex shading pipeline, followed by a fragment shading pipeline.

The vertex shading pipeline may be configured to receive (e.g. from the host processor) attributes of a plurality of vertices (which may be defined for a given graphics processing output, e.g. draw call), and to subject them to vertex shading operations that may operate to transform the attributes for each vertex into a desired form for the fragment shading pipeline. The vertex shading operations performed by the vertex shading pipeline may generate a set of output vertex attributes (i.e. appropriately "shaded" attributes) for use in the fragment shading pipeline.

The fragment shading pipeline may be configured to use the vertex shaded attributes to generate and define a plurality of primitives for processing, and to subject the primitives to processing in order, e.g., to display the frame. To do this, the (fragment shading pipeline of the) graphics processing pipeline comprises a plurality of processing stages, including at least a rasteriser that rasterises input primitives to generate graphics fragments to be processed, and a renderer that processes fragments generated by the rasteriser to generate rendered fragment data.

The rasteriser is configured to generate graphics fragments to be rendered to generate rendered fragment data for sampling positions of the desired graphics output, such as a frame to be displayed. Each graphics fragment that is generated by the rasteriser may have associated with it a set of sample positions (sampling points) of the graphics output and may be used to generate rendered graphics data for one or more of the sample positions of the set of sample positions associated with the fragment.

The rasteriser may be configured to generate the fragments for rendering in any suitable manner. It may receive e.g. primitives to be rasterised, test those primitives against sets of sample positions, and generate fragments representing the primitives accordingly.

The renderer should process the fragments generated by the rasteriser to generate rendered fragment data for (covered) sample positions that the fragments represent. The rendering process may derive the data, such as red, green and blue (RGB) colour values and an "Alpha" (transparency) value, necessary to represent the primitive at the sample positions (i.e. "shade" each sample position).

The pipeline is a tile-based graphics processing pipeline, and so the render output, e.g. frame to be displayed, is divided into a plurality of smaller sub regions, i.e. tiles. Each tile is rendered separately (e.g. one after another) (and the rendered tiles may subsequently be recombined to provide the complete render output, e.g., frame for display).

Equally, the tile-based graphics processing pipeline includes a tile buffer that is configured to store rendered fragment data at the end of the pipeline until a given tile is completed and written out to an external memory, such as a frame buffer, for use.

Thus, once generated by the renderer, the rendered fragment data is stored in the tile buffer. This may involve writing the newly generated fragment data (directly) to the tile buffer. Alternatively, where necessary, newly generated data may be blended with data that has previously been generated for the sampling point in question.

Where blending is used, rendered fragment data (i.e. newly generated rendered fragment data) may be blended with existing (i.e. previously generated) data to generate modified ("blended") rendered fragment data. The modified ("blended") rendered fragment data may then be stored in the tile buffer (e.g. in place of the existing (i.e. previously generated) data). The existing rendered fragment data may be previously stored data e.g. data stored in the tile buffer.

The tile buffer is configured to store rendered fragment data locally to (on-chip with) the graphics processing pipeline prior to that data being written out to the external memory, e.g. the frame buffer in the external memory.

The tile buffer is configured to store rendered fragment data for an array of sample positions, with each sample position of the array of sample positions having a sample value associated with it, and each sample position or group of sample positions of the array of sample positions corresponding to an output pixel of an array of output pixels.

There may be a one to one correspondence between the sample positions and the pixels of the output array, but more typically there may not be a one to one correspondence between sample positions and output pixels, as downsampling may be carried out on the rendered fragment data to generate the output pixel array. For example, the sample values may be grouped into groups of sample values (such as groups of 2×2 sample values) that are each associated with a respective (e.g. display) pixel in the tile in question.

The sample values may, e.g., comprise colour values (a colour buffer), depth values (a depth buffer), etc.

The pipeline may include a write out circuit, which may be configured to write the data in the tile buffer (once the data in the tile buffers is complete) out to the external (main) memory (e.g. to a frame buffer). This may include downsampling (averaging), the sample values in the tile buffer to the final output (pixel) value to be written to the main memory (e.g. frame buffer) and/or other output, if desired. For example, where each group of sample positions of the array of sample positions corresponds to an output pixel of the array of output pixels, the write out circuit may be configured to downsample (average) the sample values of each group of sample positions to produce an output value for the output pixel in question.

In some embodiments, the write out circuit is configured to compress data from the tile buffer, before writing it out to the external (main) memory (e.g. frame buffer). Thus, the write out circuit may include a compressor configured to compress output values before they are written out. The compressor may be configured to perform any suitable compression technique such as a block-based compression scheme, e.g. ARM Frame Buffer Compression (AFBC) (e.g. as described in US A1 2013/0034309) or Advance Frame Rate Conversion (AFRC) compression. Other compression schemes would be possible.

In the technology described herein, the pipeline is configured to maintain, in association with the tile buffer, in respect of one or more sets of plural pixels of the array of output pixels, information indicating whether all of the sample positions for that set have the same sample value.

The pipeline may be configured to maintain the information in respect of only one set of plural pixels of the output array. However, in embodiments, the pipeline is configured to maintain such information in respect of each set of a plurality of sets of plural pixels of the output array.

In particular embodiments, the output array is divided (without remainder) into a plurality of sets of plural pixels, and the information is maintained in respect of each of the sets. Each set should comprise a sub-set of the pixels in the array, i.e. may correspond to a particular region of the array. The array may be divided (without remainder) into non-overlapping and regularly sized and shaped sets.

The information indicates whether all of the sample positions for (e.g. within) a set of plural pixels of the output array have the same sample value. As described above, each output pixel may corresponds to (may have associated with it) a single sample position or a group of sample positions. Thus, the information indicates whether all of the sample positions within a set of plural sample positions that correspond to a set of plural pixels of the output array have the same sample value.

Where (as described above), there is a one to one correspondence between the sample positions and the pixels of the output array, the information may indicate whether all of the pixels within the set have the same value. Where (as described above), the sample values are grouped into groups of sample values, where each group is associated with a respective pixel in the array of output pixels, the information may indicate whether all of the sample positions that contribute to the pixels within the set have the same value.

The information is indicative of whether all of the sample positions for the set have the same sample value, i.e. whether all of the rendered fragment data within that set have the same value. As described above, the data may comprise colour data, depth data, etc. Thus, the information may be indicative of whether all of the rendered fragment data within the set have the same colour, and/or the information may be indicative of whether all of the rendered fragment data within that set have the same depth, etc.

The information may take any suitable form. In particular embodiments, the information indicates either that (i) all of the sample positions within the set have the same sample value, or that (ii) fewer than all of the sample positions within the set have the same sample value. It will be appreciated that such information can be encoded using a single bit.

Thus, the information for each set may comprise a single bit (where one value of the bit indicates that all of the sample values within the set are the same, and the other value of the bit indicates that fewer than all of the sample values within the set are the same). In various particular embodiments, the information takes the form of a bit-map, with each bit of the bit-map corresponding to a respective set, i.e. of a plurality of sets.

The information is maintained in association with the tile buffer. In embodiments, the information (e.g. bit-map) is stored in the tile buffer.

Each set of plural pixels may have any suitable size and/or shape. Each set may include any (plural) number of pixels (two or more pixels). Each set may include a contiguous set of plural (adjacent) pixels. Correspondingly, each set may include any (plural) number of (contiguous, adjacent) sample positions (two or more sample positions).

In particular embodiments, each set comprises a block of pixels (e.g. may be square, or rectangular), or a line of pixels. For example, the or each set may comprise a 1×2, 1×4, 1×8, 1×16, 1×32, etc. line of pixels, and/or the or each set may comprise a 2×2, 2×4, 4×4, 4×8, 8×8, 2×16, 2×32, etc. block of pixels. Other shapes and/or sizes would be possible.

As will be described further below, in embodiments each set may have a size and/or shape that is otherwise used in the graphics processing system. Thus for example, the sets may have the same size and configuration as, or otherwise correspond to e.g. output lines or blocks, compression lines or blocks, or input lines or blocks.

In some embodiments, the output array is divided (without remainder) into a plurality of sets of plural pixels, with each set having the same size and/or shape, and the information is maintained in respect of each of the sets.

In various further embodiments, the information is maintained in respect of sets of plural pixels having different sizes and/or shapes. For example, the information may be maintained in respect of sets of plural pixels having a first size and/or shape, and also in respect of sets of plural pixels having a second different size and/or shape (and optionally also in respect of sets of plural pixels having a third and/or further different size and/or shape, etc.).

In particular embodiments, the information is maintained in a hierarchical manner. Thus, the output array may be divided (without remainder) into sets of plural pixels at multiple different levels, where in each different level the output array is divided into sets of plural pixels having progressively larger sizes. The height and/or width of each set in each level may be a factor of two larger than that of the previous level (other factors would be possible). For example, the output array may be divided (without remainder) into 1×2, 1×4, 1×8, 1×16 and 1×32, etc. lines of pixels, and/or the output array may be divided (without remainder) into 2×2, 2×4, 4×4, 4×8 and 8×8, etc. blocks of pixels.

In these embodiments, the information may be maintained in respect of each of the sets at each of the levels. Thus, the information may indicate whether all of the sample positions have the same sample value for each set of pixels that the output array is divided into, where the output array is divided (without remainder) into sets of plural pixels at multiple different levels, where in each different level the output array is divided into sets of plural pixels having progressively larger sizes.

This can allow more flexible control of the use of the rendered fragment data stored in the tile buffer (as will be described further below).

The pipeline may be configured to maintain the information in any suitable manner. For example, it would be possible to analyse the content of the tile buffer so as to determine set(s) of plural pixels for which all of the sample positions within the set have the same sample value. This would provide a particularly accurate indication of which set(s) of plural pixels have equivalent sample values, but at the cost of significant additional processing.

In various particular embodiments, the information is maintained (tracked) as the rendered fragment data is being generated and/or stored in the tile buffer. This represents a particularly efficient and straightforward technique for maintaining the equivalence information.

As described above, during graphics processing, rendered fragment data is stored in the tile buffer by storing (optionally blended) sample values in the tile buffer in respect of individual sample positions of the array of sample positions.

In particular embodiments, before any rendered fragment data has been stored in the tile buffer (e.g. when the tile is initialised), the information is set (created) so as to indicate that all of the sample positions within each (and every) set of plural pixels have the same sample value. For example, where (as described above), the information is in the form of a bit-map, all of the bits of the bit-map may be set to one.

Then, when rendered fragment data is created for a particular sample position (optionally blended) and/or stored in the tile buffer, the information may be updated for the set (or sets) to which the sample position belongs so as to indicate that fewer than all of the sample positions within the set(s) have the same sample value. For example, the bit of the bit-map representing the set (or sets) in question may be flipped, e.g. set to zero.

Where the information is maintained in a hierarchical manner, when the information is updated for a lower level set (i.e. a set having a smaller size) so as to indicate that fewer than all of the sample positions within the lower level set have the same sample value, the information may also be updated for all higher level set(s) (i.e. set(s) having a larger size) that encompass and/or overlap with the lower level set.

In these embodiments, the information for a set may be updated so as to indicate that fewer than all of the sample positions within the set have the same sample value whenever (optionally blended) rendered fragment data is stored in the tile buffer for a sample position within the set.

Alternatively, the information may only be updated to indicate that fewer than all of the sample positions within the set have the same sample value when the set is partially covered by the newly generated fragment data, i.e. when new fragment data is stored for fewer than all of the sample positions within the set. Thus, the pipeline may be configured to determine whether the set of sampling positions for the set of plural pixels are partially covered by the newly generated fragment data, and to update the information to indicate that fewer than all of the sample positions within the set have the same sample value when it is determined that the set is partially covered by the newly generated fragment data.

Where it is determined that the set is fully covered by the newly generated fragment data, and where all of the newly generated rendered fragment data has the same value for all of the sample positions for the set, the information may not be (may other than be) updated and/or may otherwise be set (e.g. re-set) so as to indicate that all of the sample positions within the set have the same sample value.

The information may be used to control use of the rendered fragment data stored in the tile buffer in any suitable manner.

In various particular embodiments, the information is used to control the writing out of the rendered fragment data from the tile buffer to the external memory. In particular, when the information indicates that all of the sample positions within a set have the same sample value, only a single output (pixel) value may be produced (and output) from the tile buffer for that set of plural pixels. As described above, the single output value may correspond to a sample value stored in the tile buffer, or may be determined from a combination of sample values stored in the tile buffer (when downsampling is implemented).

This single output value may then be duplicated in the external memory for each of the (other) plural pixels of the set, as appropriate. For example, the single output value may be written to the external memory multiple times (once for each of the plural pixels in the set).

It will be appreciated that the number of output (i.e. read) operations can thereby be beneficially reduced.

In these embodiments, the size and/or shape of each set may be selected as desired. Where, for example, the set includes only two pixels, only a single output value need be written out for the two pixels when the information indicates that all of the sample positions within that set have the same sample value. This single output value can then be duplicated in the external memory for each of the two pixels.

In particular embodiments, the size and/or shape of each set may be selected so as to correspond to an order in which the data will be written out from the tile buffer. This order is typically set upon initialisation of the particular tile buffer in question. For example, it is common to write out the data from the tile buffer either in a block by block order (such as an interleaved block order), or in a line by line order. Thus, the size and/or shape of each set of plural pixels may be selected to correspond to a block order (interleaved block order), or to a line order.

This means that the data can be written out to the external memory in its normal order, but where the information indicates that all of the sample positions for a particular set have the same sample value, only a single output value need be output for that set, and so some output (i.e. read) operations for the set can be skipped. This single output value can be duplicated in the external memory, e.g. by writing the single output value to the external memory multiple times (once for each of the plural pixels in the set).

Where, as described above, the information is maintained in a hierarchical manner, when the rendered fragment data is being written out from the tile buffer, a determination may be made as to the largest set of plural pixels for which all of the sample positions within that set have the same sample value, and only a single output value may be output for that set of plural pixels (in the manner described above).

Thus, in various embodiments, when an output value is to be written out from the tile buffer to the external memory, the information may be used to determine the largest set of plural pixels to which the output value belongs for which all of the sample positions within that set have the same sample value. Only a single output value may then be output for the so-determined set, and the single output value may be duplicated in the external memory, e.g. by writing the single output value to the external memory multiple times (once for each of the plural pixels in the set).

In various further embodiments, where the rendered fragment data is compressed before being written out to the external memory (as described above), the information may be used to control the compression. In particular, the information may be provided to the compressor, and (when the information indicates that all of the sample positions within a set have the same sample value) the compressor may use the information to skip or speed up its compression operation(s). For example, the information may be used by the compressor to skip one or more steps of determining whether all of the pixels within a block (or blocks) of pixels that the array of output pixels has been divided into have the same output value associated with them.

In these embodiments, the size and/or shape of each set may be selected so as to correspond to a block size that the compressor would otherwise use. For example, where the compressor implements a block-based compression scheme, such as e.g. as ARM Frame Buffer Compression (AFBC) (e.g. as described in US A1 2013/0034309) or AFRC, each set may correspond to one or more block(s) (or one or more sub-block(s)) of pixels into which the output array is divided for the purposes of the compression. In this case, where the information indicates that all of the sample positions within one or more block(s) or sub-block(s) have the same value, the compressor can skip its (usual) operation, e.g. of calculating and encoding the differences between the values of the pixels within the block(s) or sub-block(s), and/or the block(s) or sub-block(s) can be straightforwardly encoded as comprising a single (e.g. colour) value. For example, for AFBC the steps of subtracting pixels, determining bit counts, and entropy encoding may be skipped, and instead the single value may be used, with the necessary AFBC information bits for the block or sub-block added directly.

Where, as described above, the information is maintained in a hierarchical manner, and a determination is made as to the largest set of plural pixels for which all of the sample positions within that set have the same sample value, the compressor may use information indicative of the largest set of plural pixels for which all of the sample positions within that set have the same sample value to skip its determination for one or more compression block(s) or sub-block(s) encompassed within the so-determined set.

Thus, in various embodiments, when output values for a block of output pixels are to be compressed before being written out from the tile buffer to the external memory, the compressor may use the information to determine whether all of the output pixels within the block have the same output value associated with them (or to determine whether all of the output pixels within one or more sub-blocks have the same output value associated with them). Where it is determined that all of the output pixels within the block have the same output value associated with them (or where it is determined that all of the output pixels within one or more sub-blocks have the same output value associated with them), the compressor may then encode the block(s) or sub-block(s) as comprising a single (e.g. colour) value.

In various further embodiments, the information is used to control blending of newly generated rendered fragment data with (previously generated) rendered fragment data stored in the tile buffer.

As described above, once generated by the renderer, rendered fragment data for a particular sampling position may be blended with rendered fragment data that has previously been generated for the same sampling position (and that has previously been stored in the tile buffer for that sampling position). This may comprise, for a particular sampling position, reading the (previously generated) existing sample value for the sampling position from the tile buffer, blending the existing sample value with the newly generated sample value for the sampling position so as to generated a blended sample value for the sampling position, and then storing the blended sample value in the tile buffer for the sampling position (i.e. overwriting the existing sample value for the sampling position in the tile buffer).

In various embodiments, when the information indicates that all of the sample positions within a set have the same sample value (and when the newly generated rendered fragment data has the same sample value for all of the sample positions within the set), only a single blend operation may be performed for all of the sample positions within the set, i.e. so as to produce a single blended sample value for all of the sample positions within the set. In particular, when the information indicates that all of the sample positions within a set have the same sample value (and when the newly generated rendered fragment data has the same sample value for all of the sample positions within the set), a single sample value for the set may be read from the tile buffer, and the single sample value may be blended with a single sample value of the newly generated rendered fragment data, so as to produce a single blended sample value for the set.

The single blended sample value may then be stored in the tile buffer for the set, as appropriate. For example, the single blended sample value may be written to the tile buffer only once for the set, and the equivalence information may be maintained (or set) to indicate that all of the sample positions for the set have the same sample value.

It will be appreciated that the number of read, blend and write operations can thereby be beneficially reduced.

In these embodiments, the size and/or shape of each set can be selected as desired (as described above). The size and/or shape of each set can be selected so as to correspond to sets of plural sample positions that are likely to have the same sample value associated with them. In particular, each set of plural pixels may correspond to a so-called "coarse pixel", as used in variable rate shading (VRS). Newly generated rendered fragment data for a variable rate shading coarse pixel will have the same sample value for all of the sample positions within the coarse pixel (and therefore for all sample positions within the set of plural pixels that corresponds to the coarse pixel).

Thus, various further embodiments relate to variable rate shading (VRS) (as defined in the DirectX and Vulkan specifications).

In Variable Rate Shading (and in embodiments), the area of the render output for which a single colour is rendered (sampled) (by the renderer of the graphics processing pipeline) can be one of plural different possibilities. For example, when a relatively fine shading rate is used, a single colour may be sampled (by the renderer) for an area of the render output corresponding to only a single output pixel. When a coarser shading rate is used, however, a single colour may be sampled (by the renderer) for an area of the render output corresponding to each pixel in a block of plural output pixels.

Thus, in embodiments, the render output is generated by the renderer using one or more of plural possible different shading rates. There may be a set of plural possible shading rates that the graphics processing pipeline supports and can use.

Correspondingly, there may be a set of plural possible different sized render output areas for which a single set of colour data value (a single colour) can be sampled (rendered) by the renderer. Accordingly, the method may comprise the renderer rendering a primitive by sampling one or more sets of colour value data (colours) for the primitive, and applying each sampled set of colour value data (colour) to an area of the render output having a size in accordance with the determined shading rate.

The smallest render output area in the set of plural possible render output areas may be referred to as a "fine pixel", and the other, larger render output areas may be referred to as "coarse pixels". Each "fine pixel" may be the same size and location as an output pixel of the output array.

The area of each possible "coarse pixel" may correspond to a block of plural "fine pixels".

The different possible shading rates may be referred to in terms of the number of fine pixels that the shading rate corresponds to. For example, a 1×1 shading rate may signify the finest possible shading mode in which a single set of colour value data is sampled for an area of the render output corresponding to a single fine pixel, whereas a 2×2 shading rate may signify that a single set of colour value data is sampled for an area of the render output corresponding to a block of 2×2 fine pixels.

The set of plural possible shading rates that may be supported by the graphics processing pipeline can include any suitable shading rates. In embodiments, the set of plural possible shading rates supported by the pipeline includes 1×1, 1×2, 2×1, 2×2, 2×4, 4×2 and 4×4 shading rates. Other shading rates would be possible.

Variable rate shading (VRS) can beneficially allow the trade-off between image quality and processing effort to be varied across a render output. For example, where a coarse pixel is used, the processing effort can be reduced (at the expense of reduced image quality).

However, the Applicant has now recognised that where a coarse pixel is used for rending (as described above), the rendered fragment data for the coarse pixel may need to be blended multiple times with the rendered fragment data that has previously been generated for each of the multiple sampling positions that correspond to the coarse pixel (and that is stored in the tile buffer), and that this can produce a performance bottleneck in the graphics processing pipeline.

Thus, as described above, in embodiments, the size and/or shape of each set of plural pixels is selected so as to correspond to a VRS coarse pixel. As such, the information may be indicative of whether all of the sample positions corresponding to a coarse pixel (i.e. corresponding to a set of plural fine pixels) have the same sample value (stored in the tile buffer).

In these embodiments, when rendered fragment data for a coarse pixel is generated by the renderer and is to be blended with (previously generated) rendered fragment data stored in the tile buffer, the information is used to determine whether all of the sample positions that correspond to the coarse pixel have the same (previously generated) sample value (stored in the tile buffer). When it is determined, from the information, that all of the sample positions that correspond to the coarse pixel have the same (previously generated) sample value (stored in the tile buffer), only a single (previously generated) sample value for the coarse pixel may be read from the tile buffer, and the single sample value may then be blended with the single (newly generated) sample value for the coarse pixel, so as to produce a single blended sample value for the coarse pixel.

The single blended sample value may then be stored in the tile buffer for the coarse pixel. For example, the single blended sample value may be written to the tile buffer only once for the coarse pixel, and the equivalence information may be maintained (or set) to indicate that all of the sample positions for the coarse pixel have the same sample value.

In these embodiments, each set of plural pixels may correspond to any size and/or shape of coarse pixel (and the information may be indicative of whether all of the sample positions that correspond to any size and/or shape of coarse pixel have the same sample value), such as e.g. a 1×2, 2×1, 2×2, 2×4, 4×2 or 4×4 coarse pixel (as described above).

However, in particular embodiments, each set of plural pixels corresponds to the largest coarse pixel that the graphics processing pipeline supports and can use (and the information is indicative of whether all of the sample positions that correspond to the largest coarse pixel that the graphics processing pipeline supports and can use have the same sample value), such as e.g. a 4×4 coarse pixel. This then allows the information to be used in respect of all coarse pixel sizes, i.e. since if the information indicates that all of the sample positions that correspond to a 4×4 coarse pixel have the same sample value, then that will also mean that all of the sample positions that correspond to a smaller coarse pixel (such as a 1×2, 2×1, 2×2, 2×4, or 4×2 coarse pixel) encompassed by the 4×4 coarse pixel will also have the same sample value.

In further embodiments, the information is maintained in respect of sets of plural pixels having different sizes, for example in respect of multiple different coarse pixel sizes. For example, the information may be maintained in respect of sets of plural pixels corresponding to coarse pixels having a first size, and also in respect of sets of plural pixels corresponding to coarse pixels having a second different size (and optionally also in respect of sets of plural pixels corresponding to coarse pixels having a third and/or further different size, etc.).

As described above, in embodiments, the information comprises a single bit for each set of plural pixels indicating either that (i) all of the sample positions within the set have the same sample value, or that (ii) fewer than all of the sample positions within the set have the same sample value.

In further embodiments, as well as indicating that a particular set of plural pixels comprises sample positions that all have the same sample value, the information may also indicate that one or more other sets of plural pixels comprise sample positions that all have the same sample value (for example where the particular set and the one or more other sets together form a superset), but where the sample values of two or more different sets within the superset may be different.

Thus, the information may indicate either that (i) for each (and every) set of plural sets (a superset) of plural (output) pixels, all of the sample positions within that set have the same sample value, or that (ii) fewer than all of the sample positions within at least one of the sets (of the superset) have the same sample value. The information may indicate that (i) for each (and every) set of the plural sets (the superset) of plural (output) pixels, all of the sample positions within that set have the same sample value either: where all of the sample positions within the superset have the same sample value, or where for each (and every) set of the superset, all of the sample positions within that set have the same sample value, but where two or more different sets of the superset have different sample values.

In these embodiments, the or each superset may be selected and configured as desired. For example, each set may correspond to a smaller variable rate shading coarse pixel, and the or each superset may correspond to a set of plural smaller variable rate shading coarse pixels that together make up a larger variable rate shading coarse pixel. For example, each set may correspond to a 1×2, 2×1, 2×2, 2×4, or 4×2 coarse pixel, and the or each superset may correspond to a 4×4 coarse pixel.

Thus, the information may indicate either that (i) for each (and every) second (small) coarse pixel within a first (large) coarse pixel, all of the sample positions within that second (small) coarse pixel have the same sample value, or that (ii) fewer than all of the sample positions within at least one of the second (small) coarse pixels have the same sample value. The information may indicate that (i) for each (and every) second (small) coarse pixel within the first (large) coarse pixel, all of the sample positions within that second (small) coarse pixel have the same sample value either: where all of the second (small) coarse pixels within the first (large) coarse pixel have the same sample value, or where for each (and every) second (small) coarse pixel within the first (large) coarse pixel, all of the sample positions within that second (small) coarse pixel have the same sample value, but where two or more different second (small) coarse pixels within the first (large) coarse pixel have different sample values.

These embodiments can allow the information to be used in the manner described above, i.e. to control blending of newly generated rendered fragment data with previously generated rendered fragment data stored in the tile buffer such that only a single blend operation is performed for all of the sample positions within a set (e.g. within a small coarse pixel), but can mean that the information need not be updated as frequently, as the equivalence may be broken less frequently. This in turn can mean that it will more often be the case that only a single blend operation is needed for all of the sample positions within a set. This can particularly be the case for variable rate shading, where each newly generated coarse pixel will have the same sample value for all of its sample positions, but where the size of each newly generated coarse pixel can change (i.e. between 1×2, 2×1, 2×2, 2×4, 4×2 and 4×4 coarse pixels).

Thus, when the information indicates that each (and every) small coarse pixel within a large coarse pixel, all of the sample positions within that small coarse pixel have the same sample value (but where two or more different coarse pixels within the large coarse pixel have different sample values), and when the newly generated rendered fragment data comprises one or more small coarse pixels (and so has the same sample value for all of the sample positions within the or each small coarse pixel), a single sample value for the or each small coarse pixel may be read from the tile buffer, and the or each single sample value may be blended with a single sample value of the newly generated rendered fragment data, so as to produce a single blended sample value for the or each small coarse pixel.

The single blended sample value may then be stored in the tile buffer for the or each small coarse pixel, as appropriate. For example, the single blended sample value may be written to the tile buffer only once for the or each small coarse pixel.

In this case, the information need not be (and in embodiments is not) updated, since it will remain the case that for each (and every) small coarse pixel within the large coarse pixel, all of the sample positions within that small coarse pixel have the same sample value (but that two or more different coarse pixels within the large coarse pixel may have different sample values).

In further embodiments, the above described embodiments may be combined, i.e. the information may indicate that (i) all of the sample positions within a superset have the same sample value, or that (ii) for each (and every) set of a plurality of sets of plural pixels that the superset is divided into, all of the sample positions within that set have the same sample value, or that (iii) fewer than all of the sample positions within at least one of the sets have the same sample value.

In these embodiments, the information will indicate that (ii) for each (and every) set of the plurality of sets that the superset is divided into, all of the sample positions within that set have the same sample value, where: although the sample positions within each (and every) respective set have the same sample value, the sample positions between at least two sets have different sample values. In other words, the information may indicate that fewer than all of the sample positions within the superset have the same sample value, but that for each and every set of plural pixels that the superset is divided into, the sample positions within that set have the same sample value.

In these embodiments, plural (e.g. two) bits may be provided in respect of each superset, and used to track the equivalence of sets of plural pixels within each superset.

Where, as described above, each superset corresponds to a larger coarse pixel (such as a 4×4 coarse pixel), and each set corresponds to a smaller coarse pixel (such as a 1×2, 2×1, 2×2, 2×4, or 4×2 coarse pixel), the information may indicate that (i) all of the sample positions within the large coarse pixel have the same sample value; or (ii) for each (and every) small coarse pixel of a plurality of small coarse pixels that the large coarse pixel is divided into, all of the sample positions within that small coarse pixel have the same sample value (but that different small coarse pixels within the large coarse pixel have different sample values); or (iii) fewer than all of the sample positions within at least one of the small coarse pixels have the same sample value.

In particular embodiments, each set of plural pixels corresponds to a 4×4 coarse pixel, and the information indicates that: (i) all of the sample positions within the 4×4 coarse pixel have the same sample value; or (ii) for each (and every) 2×2 coarse pixel that the 4×4 coarse pixel is divided into, all of the sample positions within that 2×2 coarse pixel have the same sample value (but that different 2×2 coarse pixels within the 4×4 coarse pixel have different sample values); or (iii) for each (and every) 2×1 or 1×2 coarse pixel that the 4×4 coarse pixel is divided into, all of the sample positions within that 2×1 or 1×2 coarse pixel have the same sample value (but that different 2×1 or 1×2 coarse pixels within the 4×4 coarse pixel have different sample values); or (iv) the sample positions within the 4×4 coarse pixel have different sample values such that none of (i)-(iii) is true, e.g. fewer than all of the sample positions within at least one of the 2×1 or 1×2 coarse pixels have the same sample value.

This arrangement is particularly suited to variable rate shading, and can allow the information to be used in the manner described above, i.e. to control blending of newly generated rendered fragment data with previously generated rendered fragment data stored in the tile buffer such that only a single blend operation is performed for all of the sample positions within a coarse pixel, but can mean that the information need not be updated as frequently, as the equivalence may be broken less frequently.

For example, where the information indicates that (i) all of the sample positions within the large (e.g. 4×4) coarse pixel have the same sample value, and when the newly generated rendered fragment data comprises a large (e.g. 4×4) coarse pixel, a single sample value may be read from the tile buffer, and the single sample value may be blended with a single sample value of the newly generated rendered fragment data, so as to produce a single blended sample value for the large coarse pixel. The single blended sample value may then be stored in the tile buffer for the large coarse pixel, as appropriate.

Where the information indicates that for each (and every) small (e.g. 2×2, 1×2 or 2×1) coarse pixel that the large coarse pixel is divided into, all of the sample positions within that small coarse pixel have the same sample value (but where two or more different small coarse pixels within the large coarse pixel have different sample values), and when the newly generated rendered fragment data comprises one or more small (e.g. 2×2, 1×2 or 2×1) coarse pixels (and so has the same sample value for all of the sample positions within the or each small coarse pixel), a single sample value for the or each small coarse pixel may be read from the tile buffer, and the single sample value may be blended with a single sample value of the newly generated rendered fragment data, so as to produce a single blended sample value for the or each small coarse pixel. The single blended sample value may then be stored in the tile buffer for the or each small coarse pixel, as appropriate.

Where as described above, two bits are provided in respect of each 4×4 course pixel, the information may be used to track the equivalence of only one of 1×2 and 2×1 coarse pixels. In these embodiments, the information may always be used to track the equivalence of only one of 1×2 and 2×1 coarse pixels. Alternatively, the information may be used to track the equivalence of either of 1×2 and 2×1 coarse pixels, but only one of 1×2 and 2×1 coarse pixels at any given time. Thus, the pipeline may be configured to switch between using the information to track the equivalence of 1×2 coarse pixels, and using the information to track the equivalence of 2×1 coarse pixels.

In these embodiments, when the newly generated rendered fragment data comprises one or more 1×2 or 2×1 coarse pixels, the pipeline will need to determine whether the information is indicative of the equivalence of either 1×2 or 2×1 coarse pixels. The pipeline may perform a single blend operation for the or each coarse pixel only when the newly generated rendered fragment data corresponds to the information.

The pipeline may be configured determine whether the information is indicative of the equivalence of 1×2 or 2×1 coarse pixels in any suitable manner, for example by (the blender) comparing two or more adjacent output values of the data stored in the tile buffer. For example, where the first two output values are equal, it may be determined that the information is indicative of the equivalence of 2×1 coarse pixels, but where the first two output values are unequal, it may be determined that the information is indicative of the equivalence of 1×2 coarse pixels.

Alternatively, more (e.g. three) bits may be provided in respect of each superset, and used to track the equivalence of both 1×2 and 2×1 coarse pixels. This approach will use more equivalence tracking bits, but without the need for data comparison operations. The approach can be selected as desired, depending on a trade-off between the required storage bits and the required comparison logic.

The graphics processor and graphics processing pipeline can include any suitable and desired processing circuits, processing logic, components and elements. The graphics processor and graphics processing pipeline are a tile-based graphics processor and processing pipeline operable to generate tiles of an overall render output, e.g. frame.

The graphics processing pipeline that the graphics processor executes can include any suitable and desired processing stages for generating a (the) render output (e.g. frame). Thus, the graphics processing pipeline can include, and in an embodiment does include, in addition to the above described stages, any one or one or more, and in an embodiment all, of the other processing stages that graphics processing pipelines normally include. Thus, for example, the graphics processing pipeline in an embodiment also includes a vertex shading stage, a primitive setup stage, etc. The pipeline in an embodiment also comprises a tiling stage.

A (and each) processing stage (circuit) of the graphics processing pipeline (processor) can be implemented as desired, e.g. as a fixed function hardware unit (circuit) or as a programmable processing circuit (that is programmed to perform the desired operation).

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and a compiler or compilers for compiling programs to be executed by the (programmable processing stage (shader) of the) graphics processor.

The graphics processor may also comprise, and/or be in communication with, one or more memories and/or memory devices that store the data described herein, and/or the output data generated by the graphics processor, and/or store software (e.g. (shader) program) for performing the processes described herein. The graphics processor may also be in communication with a host microprocessor, and/or with a display for displaying images based on the data generated by the graphics processor.

Embodiments can be used for all forms of output that a data processor (and processing pipeline) may be used to generate. For example, in the case of graphics processing, the graphics processing pipeline may generate frames for display, render to texture outputs, etc. The output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

Embodiments can be implemented in any suitable system, such as a suitably configured micro-processor based system. In an embodiment, the technology described herein is implemented in a computer and/or micro-processor based system.

Embodiments may be implemented in a portable device, such as a mobile phone or tablet.

The various functions of embodiments can be carried out in any desired and suitable manner. For example, the functions of embodiments can be implemented in hardware or software, as desired. Thus, for example, the various functional elements, stages, and "means" of embodiments may comprise a suitable processor or processors, controller or controllers, functional units, circuit/circuitry, processing logic, microprocessor arrangements, etc., that are operable to perform the various functions, etc., such as appropriately dedicated hardware elements (processing circuit/circuitry) and/or programmable hardware elements (processing circuit/circuitry) that can be programmed to operate in the desired manner.

It should also be noted here that, as will be appreciated by those skilled in the art, the various functions, etc., of embodiments may be duplicated and/or carried out in parallel on a given processor. Equally, the various processing stages may share processing circuit/circuitry, etc., if desired.

It will also be appreciated by those skilled in the art that all of the described embodiments can include, as appropriate, any one or more or all of the optional features described herein.

The methods in accordance with embodiments may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

Embodiments also extend to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of embodiments need be carried out by computer software and thus from a further broad embodiment the technology described herein provides computer software and such software installed on a computer software carrier for carrying out at least one of the steps of the methods set out herein.

Embodiments may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the present embodiment. The graphics processing pipeline 1 shown in FIG. 1 is a tile based renderer and will thus produce tiles of a render output data array, such as an output frame to be generated.

In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuit/circuitry and/ or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 3, such as transformation and lighting operations (not shown), and a primitive set up stage (not shown) to set up the primitives to be rendered, in response to the commands and vertex data provided to the graphics processor.

As shown in FIG. 1, this part of the graphics processing pipeline 1 includes a number of stages, including a rasterisation stage 4, an early Z (depth) and stencil test stage 5, a renderer in the form of a fragment shading stage 6, a late Z (depth) and stencil test stage 7, a blending stage 8, a tile buffer 9 and a downsampling and writeout (multisample resolve) stage 10.

The rasterisation stage 4 of the graphics processing pipeline 1 operates to rasterise the primitives 2 making up the render output (e.g. the image to be displayed) into individual graphics fragments for processing. To do this, the rasteriser 4 receives graphics primitives 2 for rendering, rasterises the primitives to sampling points and generates graphics fragments having appropriate positions (representing appropriate sampling positions) for rendering the primitives.

The fragments generated by the rasteriser 4 are then sent onwards to the rest of the pipeline for processing.

The early Z/stencil stage 5 performs a Z (depth) test on fragments it receives from the rasteriser 4, to see if any fragments can be discarded (culled) at this stage. To do this, it compares the depth values of (associated with) fragments issuing from the rasteriser 4 with the depth values of fragments that have already been rendered (these depth values are stored in a depth (Z) buffer that is part of the tile buffer 9) to determine whether the new fragments will be occluded by fragments that have already been rendered (or not). At the same time, an early stencil test is carried out.

Fragments that pass the fragment early Z and stencil test stage 5 are then sent to the fragment shading stage 6. The fragment shading stage 6 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z buffer value for the fragment's position stored in the Z-buffer in the tile buffers 9 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 9 in the blender 8. Any other remaining operations necessary on the fragments, such as dither, etc. (not shown) are also carried out at this stage.

Finally, the (blended) output fragment data (values) are written to the tile buffer 9 from where they can, for example, be output to a frame buffer for display. The depth value for an output fragment is also written appropriately to a Z buffer within the tile buffer 9.

The tile buffer 9 will store colour and depth buffers that store an appropriate colour, etc., or Z value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

For example, the tile buffer 9 may store its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer 9 is provided as part of RAM that is located on (local to) the graphics processing pipeline 1 (chip).

The data from the tile buffer 9 is input to a downsampling (multisample resolve) write out unit 10, and thence output (written back) to an external memory output buffer, such as a frame buffer of a display device (not shown). The display device could comprise, e.g., a display comprising an array of pixels, such as a computer monitor or a printer.

The downsampling and writeout unit 10 downsamples the fragment data stored in the tile buffer 9 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The writeout unit 10 writing out data from the tile buffer 9 to external memory can consume a significant amount of memory bandwidth and power. Bandwidth consumption can be a big source of heat and of power consumption, and so it is generally desirable to try to reduce bandwidth consumption for external memory writes in graphics processing systems.

Embodiments are directed to a method of operating a tile-based graphics processing pipeline 1, in which the pipeline 1 is configured to maintain information indicating whether sample values of rendered fragment data stored in the tile buffer 9 for a set of plural pixels (or for each set of a plurality of sets of plural pixels) have the same value. In other words, the pipeline 1 is configured to track the equivalence of set(s) of plural pixels.

The Applicant has recognised that maintaining (tracking) this information at the granularity of sets of plural output pixels can be particularly useful for controlling use of the data in various circumstances.

In particular, the information can be used to control the writing out of the rendered fragment data from the tile buffer 9 to the external memory, e.g. such that only a single output pixel value is produced and output for a set of plural pixels when the information indicates that all of the sample positions for that set have the same sample value. This single output value can then be duplicated in the external memory for each of the plural pixels of the set, e.g. by writing the single output value to the external memory multiple times, once for each of the plural pixels in the set. Thus, embodiments relate to pixel equivalence tracking in the tile buffer 9 for faster write back.

Additionally or alternatively, where the rendered fragment data is compressed before being written out to the external memory, the information can be used to control the compression. In particular, some operations that the compressor would normally perform can be skipped or speeded up where the compressor 11 knows, based on the information, that all of the sample positions for a set have the same sample value.

Equally, the information can be used to control blending of newly generated rendered fragment data with previously generated rendered fragment data stored in the tile buffer 9, e.g. such that only a single blend operation is performed for all of the sample positions within a set when the information indicates that all of the sample positions for the set have the same sample value (and when the newly generated rendered fragment data has the same value for all of the sample positions within the set). The single blended value can then be stored in the tile buffer 9 for the set, e.g. by writing the single blended sample value to the tile buffer 9 only once for the set. The equivalence information can then be set to indicate that all of the sample positions for the set have the same sample value.

Embodiments can reduce the number of operations (e.g. read, write, blend, and/or compression operations) required when processing graphics data for display. The overall effect of this is that the bandwidth and/or power requirements of the graphics processing pipeline, and therefore the overall graphics processing system, can be beneficially reduced.

Figure 2:
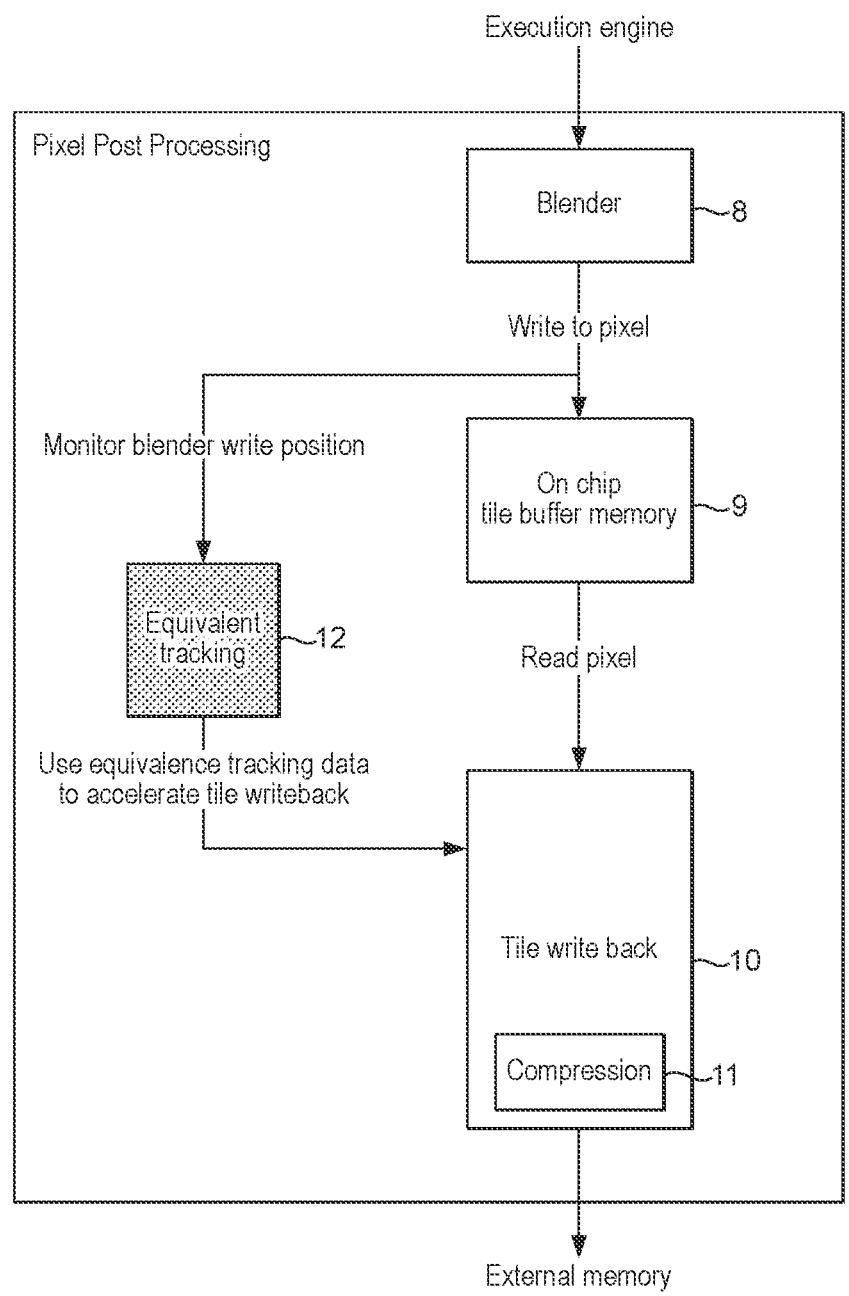
FIG. 2 shows schematically part of a graphics processing pipeline in accordance with various embodiments.

FIG. 2 illustrates part of the graphics processing pipeline 1 configured in accordance with various embodiments. As shown in FIG. 2 (and as described above), the graphics processing pipeline 1 includes a blender 8, a tile buffer 9, and a tile write back stage 10.

As also shown in FIG. 2, the graphics processing pipeline 1 includes an equivalence tracking stage 12, which is configured to track the equivalence of sets of plural pixels of the render output (i.e. subsets of pixels of an array of output pixels).

In this respect, the output array is in effect divided (without remainder) into a plurality of non-overlapping and regularly sized and shaped sets of plural pixels, and the equivalence tracking stage 12 is configured to maintain equivalence information that is indicative of whether all of the sample positions within each set have the same sample value. The information may comprise a single bit for each set indicating either that (i) all of the sample positions within the set have the same sample value, or that (ii) fewer than all of the sample positions within the set have the same sample value. Thus, the equivalence tracking stage 12 may be configured to maintain the information in the form of a bit-map (or otherwise).

The equivalence tracking stage 12 is configured to maintain (to track) the information by monitoring which sample positions within the tile buffer 9 are written to by the blender 8.

When a new render output is to be generated, the driver on the host processor allocates a portion of the RAM that is located on (local to) the graphics processing pipeline 1 (on-chip) to the tile buffer 9. In the present embodiment, at this time (i.e. when a tile is initialised), the equivalence tracking stage 12 may also initialise the equivalence tracking information. The pixel equivalence tracking bits can be stored, e.g. in the Vtile unit as a property of a tile, or in or near the tile buffer RAM, e.g. where the equivalence is tracked per memory word or multiple words. The information for a tile may be initially set so as to indicate that all the sample values for all of the sets are equal.

As shown in FIG. 2, the equivalence tracking stage 12 may be configured to monitor which sample positions within the tile buffer 9 are written to. When new fragment data is written to the tile buffer 9, the information may be updated for the set or for each of the sets to which the particular sample position(s) that have been written to belong, i.e. to indicate that the sample values within the set(s) may not now be equal. For example, the bit of the bit-map representing the set (or sets) in question may be flipped, e.g. set to zero.

As shown in FIG. 2, this information may be used to accelerate the writeback circuit 10 writing back the fragment data stored in the tile buffer 9 to the external memory.

As described above, tile buffer write back is the process of reading data from the on chip memory (tile buffer) 9 and writing it to the external memory. This is normally done in a predefined order, such as linear or block interleaved order. That is, the tile write back stage 10 may be configured to write back data from the tile buffer 9 to the external memory in the form of lines (i.e. rows of pixel positions that are one pixel position high and plural pixels positions wide (long)), or blocks (i.e. squares or rectangles of pixel positions that are plural pixel positions high and plural pixels positions wide (long)). The write back order for a tile may be set when the tile is initialised.

When it is known, from the information maintained by the equivalence tracking stage 12, that a group of pixels in the writeback order contains the same value, only one pixel is read from the tile buffer 9, and the data is duplicated to write it to the external memory.

As also shown in FIG. 2, the tile write back stage 10 may also comprise a compressor 11 configured to compress the output pixel data, e.g. using a block-based encoding scheme such as ARM Frame Buffer Compression (AFBC) (e.g. as described in US A1 2013/0034309) or AFRC, in which the compressor 11 is configured to compress blocks of output pixels and write compressed blocks of output pixels to the external memory.

When the data needs to be compressed, the equivalence information is passed to the compressor 11, which can constructed a compressed data stream in a faster way. For example, for block based compression schemes such as AFBC and AFRC, the compressor 11 can compress equal pixel blocks (such as 2×2, 2×4 or 4×4 pixel blocks) faster using the information.

In embodiments, the information can be maintained in respect of blocks of pixels or in respect of lines of pixels.

In some embodiments, the information is maintained in a hierarchical manner, i.e. where the output array is divided (without remainder) into sets of plural pixels at multiple different levels, where in each different level the output array is divided into sets of plural pixels having progressively larger sizes. The height and/or width of each set in each level may be a factor of two larger than that of the previous level. In these embodiments, during writeback, the equivalence tree can be searched from the top to the bottom, to find the maximum number of equal pixels that can be written back together, and/or to optimise the writeback performance by duplicating equal data and/or generating compressed data from one input data.

Figure 3:
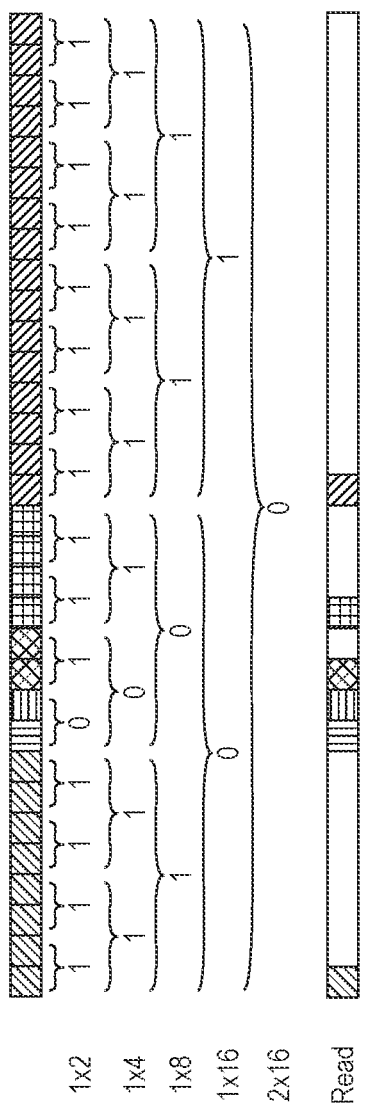
FIG. 3 illustrates a hierarchical linear equivalence tracking scheme in accordance with various embodiments.
Figure 3:
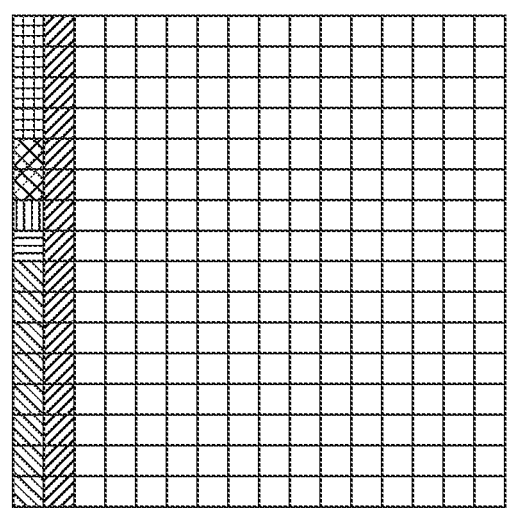

FIG. 3 illustrates an embodiment in which the information is maintained in a hierarchical manner for lines of pixels, i.e. where a hierarchical linear equivalence-tracking scheme is used. As illustrated in FIG. 3, the equivalence information is maintained in respect of sets of 1×2, 1×4, 1×8, 1×16, and 2×16 lines of pixels. In FIG. 3, a "1" indicates that a set of pixels all have the same value, and a "0" indicates that a set of pixels do not all have the same value.

In this embodiment, the data may be written out to the external memory in its normal line order, but where the information indicates that all of the sample positions for a particular line (set) have the same sample value, only a single output value need be output for that line (set), and so some output (i.e. read) operations for the line (set) can be skipped. This is illustrated in FIG. 3, where empty boxes are indicative of skipped reads. The single output value is duplicated in the external memory, e.g. by writing the single output value to the external memory multiple time, once for each of the plural pixels in the line (set).

Linear equivalence tracking may be used for full-linear and block-linear write interleave modes. In linear writeback mode, the equivalence of each line of a vtile may be tracked, e.g. in the size of 1×4, 1×8, 1×16, 1×32 (depending on the effective tile size) and/or 2×16 and 2×32, or even more lines together. When writing back in linear order, the equivalence class of the entire line is firstly checked. If the line is equal, the first pixel is read and is duplicated for the line, e.g. when generating the AXI (Advanced Extensible Interface) burst.

Figure 4:
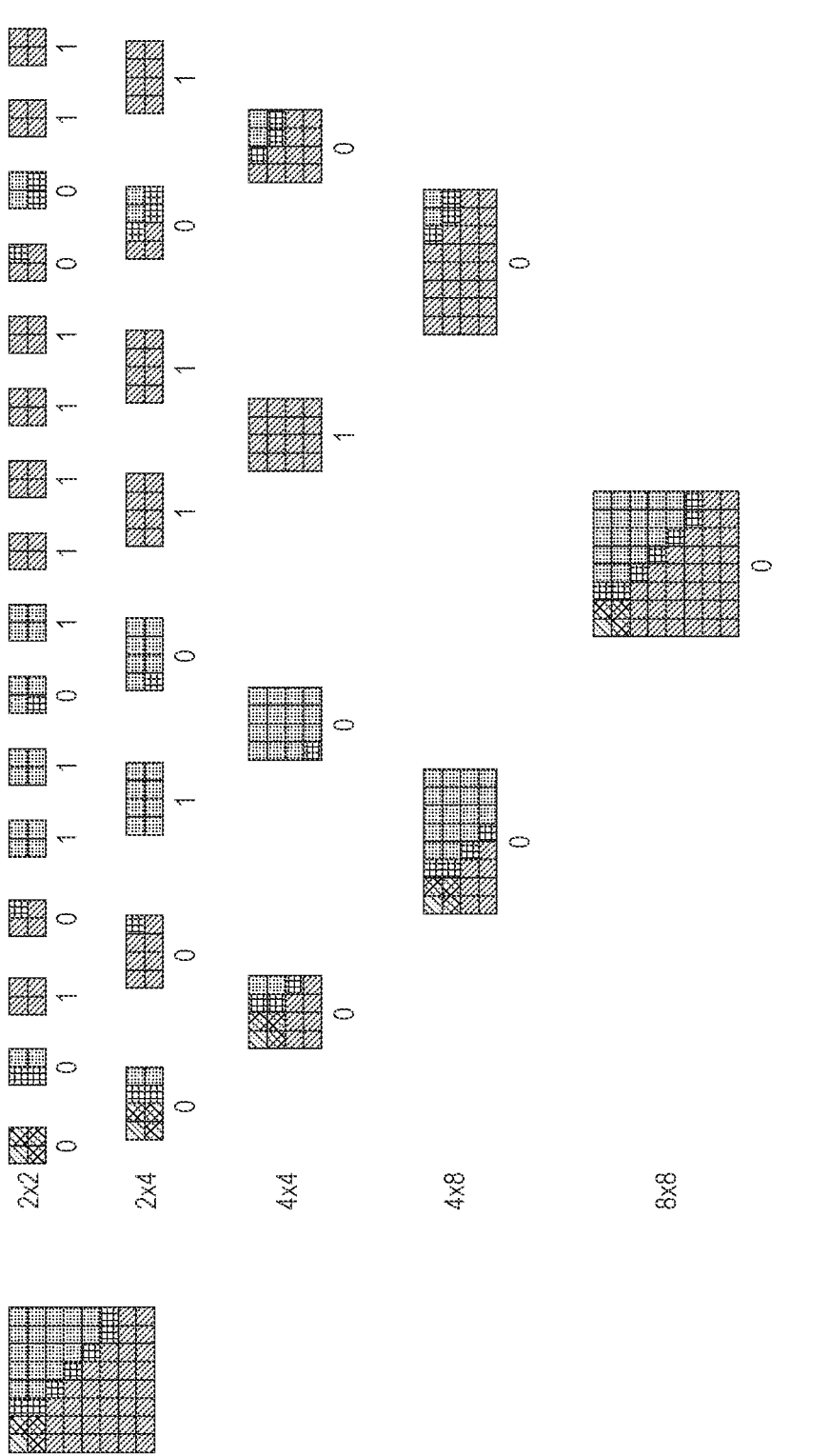
FIG. 4 illustrates a hierarchical block equivalence tracking scheme in accordance with various embodiments.

FIG. 4 illustrates an embodiment in which the information is maintained in a hierarchical manner for blocks of pixels, i.e. where a hierarchical block equivalence-tracking scheme is used. As illustrated in FIG. 4, the equivalence information is maintained in respect of sets of 2×2, 2×4, 4×4, 4×8, and 8×8 blocks of pixels. The equivalence state may also be tracked for e.g. 16×16, 32×16 and 32×32 sub blocks in a tile. Again, a "1" indicates that a block of pixels all have the same value, and a "0" indicates that a block of pixels do not all have the same value.

Again, the data can be written out to the external memory in its normal block order, but where the information indicates that all of the sample positions for a particular block have the same sample value, only a single output value need be output for that block, and so some output (i.e. read) operations for the block can be skipped. This is illustrated in FIG. 4, where empty boxes are indicative of skipped reads. This single output value is then duplicated in the external memory, e.g. by writing the single output value to the external memory multiple times, once for each of the plural pixels in the block.

The hierarchical block equivalence-tracking scheme of FIG. 4 can be used to accelerate write back in block interleave order, or when using block-based compression (such as AFBC or AFRC).

It will be appreciated that the present embodiment reduces the number of memory reads from the on-chip memory and thus reduces memory access conflicts between write back (read) and blending (read and write), which improves performance.

It should be noted that data does not need to be duplicated when writing back with compression. Instead, the equivalence information can be sent to the data encoder 11 to generate compressed data. This can be as fast as 1 cycle in AFBC for a block of 4×4, 8×8 or 16×16 pixels (otherwise, it would take 4 or 16 or 64 cycles by a 4 pixel/cycle throughput AFBC encoder).

It should also be noted that performance can be improved when the write back order is different from the tile buffer internal pixel order. For example, the tile buffer internal pixel order may be block interleaved order. When write back is in linear order (full linear or block linear), only two pixels can normally be read out from a consecutive 2×2 block at each cycle, thereby limiting the writeback performance. When the linear equivalence tracking scheme is implemented, if it is known that a line of 1×16 pixels is equal, only the first pixel is read, and the data is duplicated for the whole line.

Figure 5:
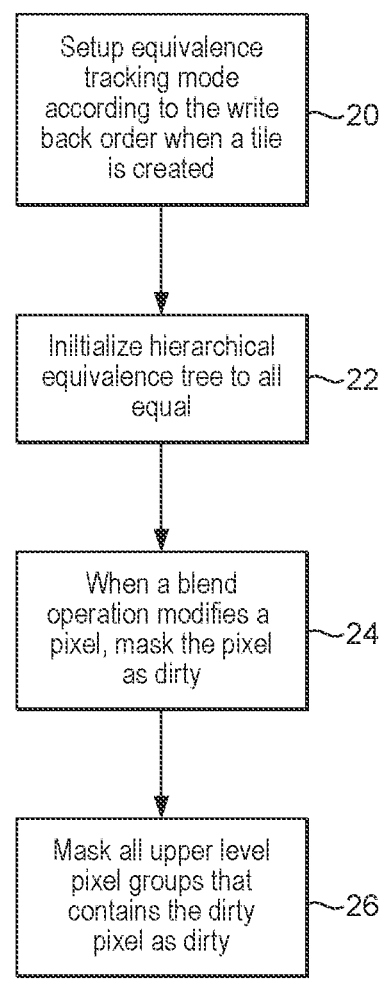
FIG. 5 is a flowchart illustrating a method of tracking equivalence information in a hierarchical equivalence tracking scheme in accordance with various embodiments.

FIG. 5 illustrates a method for updating the equivalence tracking status bits for a hierarchical tracking scheme.

As shown in FIG. 5, when a tile is created, the equivalence tracking mode may be set depending on the write back order for the tile (step 20). Then, the equivalence state bits, e.g. in the form of a hierarchical equivalence tree, are set to indicate that all of the groups of pixels are equal (step 22). The equivalence state bits may then be updated by the blender 8. When a pixel is written by the blender 8, the pixel is masked as being a dirty pixel (step 24). The line or block which contains that pixel is then marked as non-equal. In hierarchical tracking the equivalence is broken in all levels of nodes containing the dirty pixel, and so all upper level pixel groups that contain the dirty pixel are masked as dirty (step 26).

Figure 6:
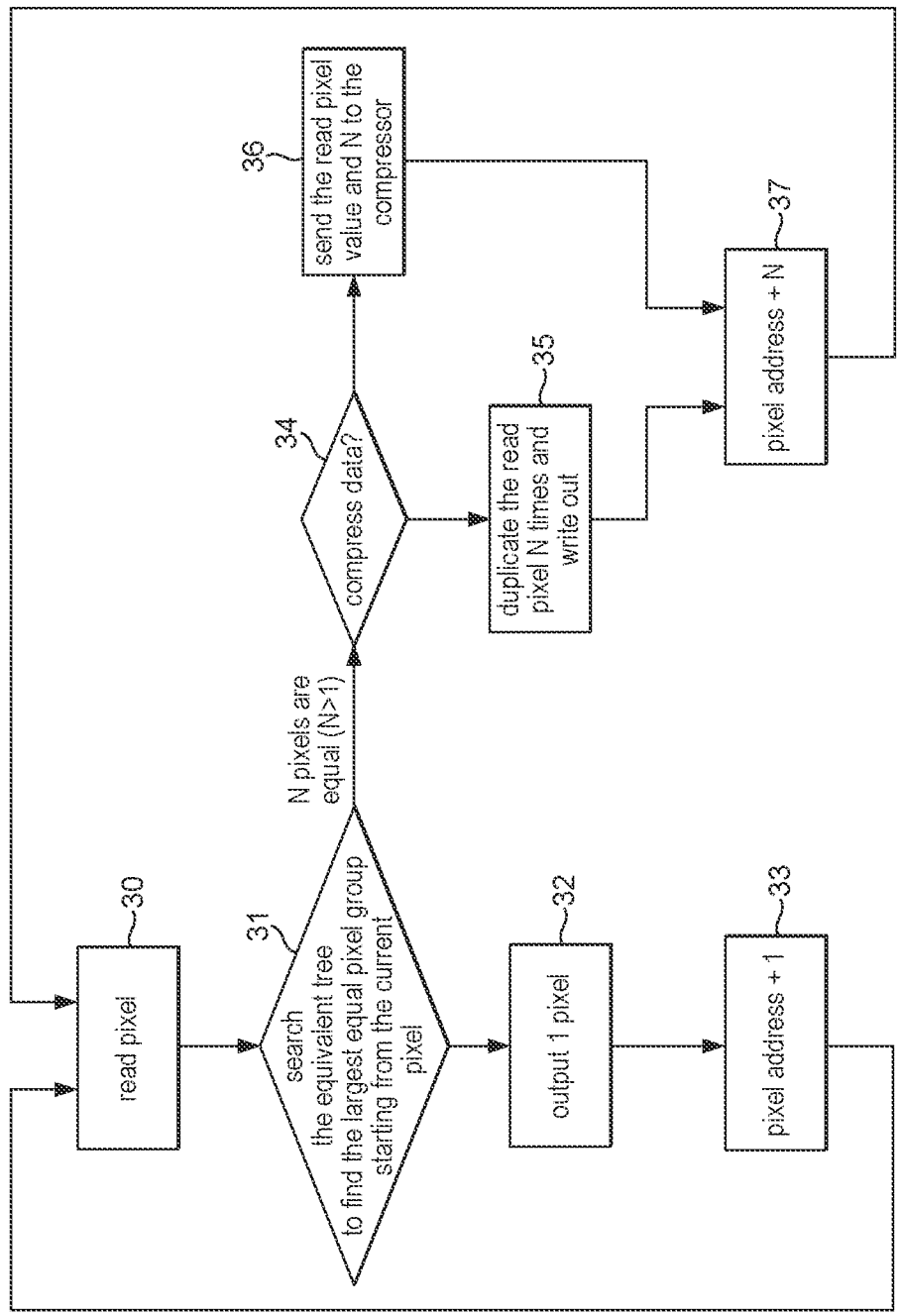
FIG. 6 is a flowchart illustrating a method of using equivalence information in a hierarchical equivalence tracking scheme in accordance with various embodiments.

FIG. 6 illustrates a tile write back method in accordance with a hierarchical tracking embodiment. As shown in FIG. 6, a pixel is initially read from the tile buffer 9 (step 30). The equivalence tree to searched to find the largest equal pixel group starting from the current pixel (step 31). Where the current pixel is not part of an equal pixel group, the single pixel is output (step 32), and the process continues with the next pixel in the write back order (step 33).

Where at step 31, the current pixel is part of an equal pixel group of N pixels (where N is an integer greater than one), it is then determined whether or not the pixel group is to be compressed (step 34). Where the data is not to be compressed, the read pixel is duplicated N times and written out to the external memory (as described above) (step 35). Where the data is to be compressed, the read pixel value and the value N is sent to the compressor 11 (as described above). The process then continues with the next pixel in the write back order which will be the Nth pixel following the current pixel (step 37).

Various embodiments relate in particular to so-called Variable Rate Shading (VRS).

As described above, variable rate shading (VRS) is a technique that allows different shading rates to be used to render a render output, i.e. such that a single colour (set of colour value data) can be sampled (rendered) for one of plural possible different sized areas in a render output. For example, a single colour may be sampled for an area of the render output corresponding to only a single pixel, or a single colour may be sampled for an area of the render output corresponding to each pixel in a block of plural pixels.

Sampling (rendering) a single colour and applying it to plural sampling points (e.g. pixels) will reduce the processing effort required for those sampling points, as compared to sampling an individual colour for each sampling point, but will usually come at the expense of reduced image quality.

In Variable Rate Shading (VRS), there will typically be a set of plural possible shading rates that a graphics processor supports and is able to use. That is, there will typically be a set of plural possible different sized render output areas that a single colour (set of colour value data) can be sampled for. The smallest possible of these render output areas may be referred to as a "fine pixel", and the other, larger render output areas may be referred to as "coarse pixels".

Each "fine pixel" will typically be the same size and location as a pixel of the output display device. However, it is also possible for each "fine pixel" to effectively correspond to less than one pixel of the output display device, for example where downsampling is to be applied.

The area of each possible "coarse pixel" typically corresponds to a block of plural "fine pixels". The different possible shading rates are then referred to in terms of the number of fine pixels that the shading rate corresponds to. For example, a 1×1 shading rate will signify the finest possible shading mode in which a single colour should be sampled for a single fine pixel, whereas a 2×2 shading rate will signify that a single colour should be sampled for an area corresponding to a block of 2×2 fine pixels. A graphics processor may typically support 1×1, 1×2, 2×1, 2×2, 2×4, 4×2 and 4×4 shading rates, for example.

Figure 7:
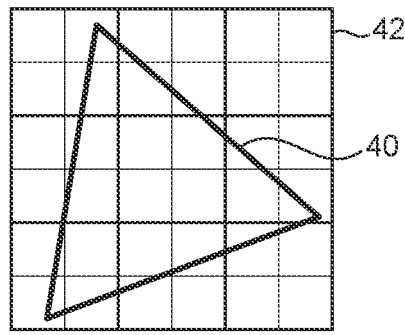
FIG. 7 illustrates a primitive that may be rendered using different shading rates in accordance with various embodiments.

FIG. 7 illustrates a comparison of an exemplary primitive 40 being rendered using 1×1 and 2×2 shading rates. FIG. 7 shows the location of the exemplary primitive 40 to be rendered relative to a 6×6 block of fine pixels 42. Each small square represents one of the fine pixels of the "variable rate shading" (VRS) process.

In the case of a 1×1 shading rate, the rendering process samples (renders) a single colour (set of colour value data) for each fine pixel that a primitive covers. In this case, the primitive 40 is visible in (covers) 23 out of the 36 illustrated fine pixels, and so the rendering process will sample a total of 23 colours (sets of colour value data).

Each larger square in FIG. 7 represents one 2×2 coarse pixel that is used in the 2×2 shading rate process. Each 2×2 coarse pixel encompasses a block of 2×2 fine pixels. In this case, the rendering process samples (renders) a single colour (set of colour value data) for each such coarse pixel that a primitive covers. In this case, the primitive 40 covers 8 out of the 9 illustrated 2×2 coarse pixels, and so the rendering process will sample only 8 colours (sets of colour values).

Thus, it will be appreciated that a coarser shading rate is associated with a lower density of rendered colours as compared to a finer shading rate. Moreover, it will be appreciated that rendering the primitive 40 using a coarser shading rate will reduce processing requirements, as compared to rendering the primitive 40 using a finer shading rate. However, this will typically come at the expense of reduced image quality.

Variable Rate Shading (VRS) allows an application to select a shading rate, which means that groups of pixels (1×1, 1×2, 2×1, 2×2, 2×4, 4×2 or 4×4) are shaded once and the colour value is broadcast to all covered pixels in the "coarse pixel". This saves computational effort at the cost of some visual degradation. It is possible to only support the 1×1, 1×2, 2×1 and 2×2 shading rates. 4×2, 2×4 and 4×4 shading rates may be optional.

Thus, in VRS, shading can be performed with the granularity of coarse pixels, which can contain up to 4×4 fine pixels in each thread. However, the blending stage 8 still needs to blend the data at the granularity of fine pixels, which can become a performance bottleneck. Accordingly, in the present embodiment, pixel equivalences are tracked in the tile buffer 9 for fast blending in variable rate shading (VRS), so as to accelerate blender throughput.

In the present embodiment, the pipeline 1 is configured to track pixel equivalences for groups of 4×4 fine pixels in the tile buffer 9. When a coarse pixel area (which can be 1×2, 2×1, 2×2, 2×4, 4×2, 4×4 fine pixels) contains all equal fine pixels, it is blended once, and the data is duplicated in the tile buffer 9. If the equivalence state is not equal, the blending is performed for fine pixels at a lower speed.

Because VRS can operate in different shading rates (coarse pixel sizes) on the same fine pixel, the tracking may be on 4×4 fine pixels, so as to cover all shading rates.

In these embodiments, the equivalence state is broken if fine pixels are modified. This can be determined by checking the VRS coverage if it is a partial coverage. It can also be determined by comparing pixel values, but at a higher implementation cost. A non-equal coarse pixel can be set to equal if an opaque blending has a full coverage of all fine pixels.

Figure 8:
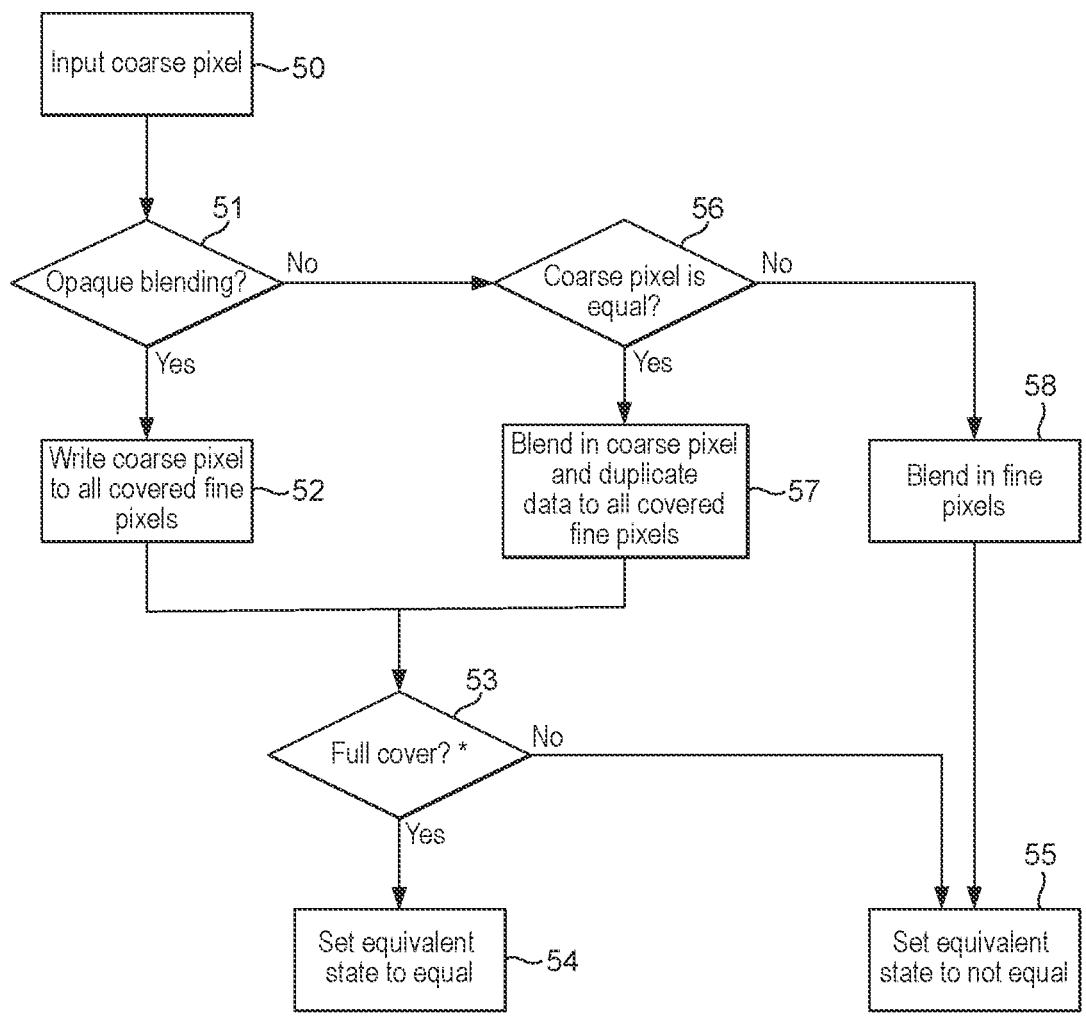
FIG. 8 is a flowchart illustrating a method of using equivalence information for Variable Rate Shading (VRS) in accordance with various embodiments.

FIG. 8 illustrates a method in accordance with these embodiments. As shown in FIG. 8, for an input coarse pixel 50 generated by the renderer 6, it is determined whether that coarse pixel 50 is to be subjected to opaque blending (step 51). Where this is the case, the coarse pixel is written to all of the covered fine pixels in the tile buffer 9 (step 52). It is then determined whether the coarse pixel fully covered a set of pixels for which equivalence information is being maintained (step 53), and if this is the case, the equivalence information for that set is set to indicate that all the pixels within the set are now equal (step 54). Otherwise, the equivalence information for the set is set to indicate that not all the pixels within the set are now equal (step 55).

Where, at step 51, it is determined that opaque blending is not to be used (i.e. where the coarse pixel is partially transparent), it is then determined whether the existing data corresponding the coarse pixel stored in the tile buffer 9 is equal for all sampling positions covered by the coarse pixel (step 56). Where this is the case, the coarse pixel is blended once and duplicated for all of the covered fine pixels in the tile buffer 9 (step 57). The process then continues with step 53, to determine whether the coarse pixel fully covers a set of pixels for which equivalence information is being maintained (step 53), and to update the equivalence information for that set accordingly (steps 54 and 55).

Where, on the other hand, at step 56 it is determined that the existing data corresponding the coarse pixel stored in the tile buffer 9 is not equal for all sampling positions covered by the coarse pixel, the coarse pixel is blended for each of the covered fine pixels (step 58), and the equivalence information for the set is set to indicate that not all the pixels within the set are now equal (step 55).

In these embodiments, if the coarse pixel size does not match the equivalent tracking area, at step 53, the coarse pixel can either be treated as not fully covering the area, or the data can be compared to other threads within the tracking area to determine whether or not this is the case. For example, for a 4×2 coarse pixel size in a 4×4 equivalent tracking scheme, the two 4×2 results corresponding to the 4×4 region can be compared, and the equivalence information can be set to equal (step 54) if the results are the same.

In a further embodiment, as well as tracking the equivalence of each 4×4 coarse pixel, the equivalence information can be used to track the equivalence of each smaller (e.g. 2×2, 1×2 and/or 2×1) coarse pixel within the 4×4 coarse pixel.

For example, 2 bits may be provided per 4×4 coarse pixel, and used to indicate either that (i) all of the fragment data stored in the tile buffer for the 4×4 coarse pixel is equal; (ii) the fragment data stored in the tile buffer is equal for each of the 2×2 coarse pixels that make up the 4×4 coarse pixel (but that at least two of the 2×2 coarse pixels have different sample values); (iii) the fragment data stored in the tile buffer is equal for each of the 1×2 and/or 2×1 coarse pixels that make up the 4×4 coarse pixel (but that at least two of the 1×2 and/or 2×1 coarse pixels have different sample values); or that (iv) fewer than all of the sample positions within at least one of the 1×2 and/or 2×1 coarse pixels have the same sample value.

This can allow fast blending (as described above), but can mean that the information need not be updated as frequently, as the equivalence will be broken less frequently. This in turn can mean that fast blending can be performed more often, particularly during variable rate shading, where each newly generated coarse pixel will have the same sample value for all of its sample positions, but where the size of each newly generated coarse pixel can change (i.e. between 1×2, 2×1, 2×2, 2×4, 4×2 and 4×4 coarse pixels).

In these embodiments, the two equivalence bits may be used to indicate the equivalence of only one of 1×2 and 2×1 coarse pixels. It would be possible for the pipeline to switch between using the equivalence bits to indicate that 1×2 coarse pixels are equal, and using the equivalence bits to indicate that 2×1 coarse pixels are equal. In this case, data values may be compared when the blender reads the data from the tile buffer, so as to determine whether the information is indicative of 1×2 or 2×1 coarse pixels being equal. If the first two pixel values of one word are equal, it may be determined that the information is indicative of the equivalence of 2×1 coarse pixels, and if the first two pixel values of one word are unequal, it may be determined that the information is indicative of the equivalence of 1×2 coarse pixels.

Alternatively, more (e.g. three) equivalence bits may be used to indicate the equivalence of both of 1×2 and 2×1 coarse pixels. The first approach uses less equivalence tracking bits, but at the expense of an additional data comparison operation, whereas the second approach uses more equivalence tracking bits but without the need for data comparison operation. The approach can accordingly be selected depending on a trade-off between storage bits and comparison logic.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical applications, to thereby enable others skilled in the art to best utilise the technology, in various embodiments and with various modifications as are suited to the particular use contemplated. It is intended that the scope be defined by the claims appended hereto.

What is claimed is:

1. A method of operating a tile-based graphics processing pipeline that comprises:
   a plurality of processing stages, including at least a rasteriser that rasterises input primitives to generate graphics fragments to be processed, and a renderer that processes fragments generated by the rasteriser to generate rendered fragment data; and
   a tile buffer configured to store rendered fragment data locally to the graphics processing pipeline prior to that data being written out to an external memory, wherein the tile buffer is configured to store rendered fragment data for an array of sample positions, with each sample position of the array of sample positions having a sample value associated with it, and each sample position or group of sample positions of the array of sample positions corresponding to an output pixel of an array of output pixels;
   the method comprising:
   maintaining, in association with the tile buffer, in respect of one or more sets of plural pixels of the array of output pixels, information indicating whether all of the sample positions for that set have the same sample value; and
   using the information to control use of the rendered fragment data stored in the tile buffer; wherein using the information to control use of the rendered fragment data stored in the tile buffer comprises using the information to control blending of newly generated rendered fragment data with rendered fragment data stored in the tile buffer.

2. The method of claim 1, wherein using the information to control use of the rendered fragment data stored in the tile buffer comprises using the information to control writing out of the rendered fragment data from the tile buffer to the external memory; or
   wherein using the information to control use of the rendered fragment data stored in the tile buffer comprises using the information to control compression of the rendered fragment data.

3. The method of claim 2, wherein using the information to control use of the rendered fragment data stored in the tile buffer comprises using the information to control writing out of the rendered fragment data from the tile buffer to the external memory, and wherein using the information to control writing out of the rendered fragment data from the tile buffer to the external memory comprises:

outputting only a single output value for a set of plural pixels when the information indicates that all of the sample positions for that set have the same sample value; and duplicating the single output value in the external memory.

4. The method of claim 1, wherein the information indicates, for each set, either (i) that all of the sample positions within the set have the same sample value, or (ii) that fewer than all of the sample positions within the set have the same sample value; or wherein the information indicates either (i) that for each set of plural pixels within a superset, all of the sample positions within that set have the same sample value, or (ii) that fewer than all of the sample positions within at least one set of the superset have the same sample value.

5. The method of claim 4, wherein each superset corresponds to a first variable rate shading (VRS) coarse pixel, and each set corresponds to a second variable rate shading (VRS) coarse pixel of plural second variable rate shading (VRS) coarse pixels that the first variable rate shading (VRS) coarse pixel is divided into, and wherein the information indicates that: (i) all of the sample positions within the first coarse pixel have the same sample value; or (ii) for each second coarse pixel, all of the sample positions within that second coarse pixel have the same sample value; or (iii) fewer than all of the sample positions within at least one of the second coarse pixels have the same sample value.

6. The method of claim 1, where the output array is divided into sets of plural pixels at multiple levels, where at each level the output array is divided into sets of plural pixels with progressively larger sizes, and where the information indicates whether all of the sample positions for each set of pixels have the same sample value for each of the multiple levels.

7. The method of claim 6, wherein using the information to control use of the rendered fragment data stored in the tile buffer comprises:

using the information to determine a largest set of plural pixels for which all of the sample positions within that set have the same sample value; and controlling the use of the rendered fragment data stored in the tile buffer based on the determination.

8. The method of claim 1, wherein using the information to control blending of newly generated rendered fragment data with rendered fragment data stored in the tile buffer comprises:

determining, using the information, whether all of the sample positions for a set have the same sample value; and when it is determined, using the information, that all of the sample positions for a set have the same sample value, producing only a single blended sample value for all of the sample positions within the set.

9. The method of claim 1, wherein each set of plural pixels corresponds to a variable rate shading (VRS) coarse pixel, and the information is indicative of whether all of the sample positions corresponding to a variable rate shading (VRS) coarse pixel have the same sample value; and wherein using the information to control blending of newly generated rendered fragment data with rendered fragment data stored in the tile buffer comprises:

determining, using the information, whether all of the sample positions that correspond to a variable rate shading (VRS) coarse pixel have the same sample value; and when it is determined, using the information, that all of the sample positions that correspond to a variable rate shading (VRS) coarse pixel have the same sample value, producing a single blended sample value for the variable rate shading (VRS) coarse pixel.

10. A tile-based graphics processing pipeline comprising:

a plurality of processing stages, including at least a rasteriser that rasterises input primitives to generate graphics fragments to be processed, and a renderer that processes fragments generated by the rasteriser to generate rendered fragment data; and a tile buffer configured to store rendered fragment data locally to the graphics processing pipeline prior to that data being written out to an external memory, wherein the tile buffer is configured to store rendered fragment data for an array of sample positions, with each sample position of the array of sample positions having a sample value associated with it, and each sample position or group of sample positions of the array of sample positions corresponding to an output pixel of an array of output pixels;

wherein the pipeline is configured to:

maintain, in association with the tile buffer, in respect of one or more sets of plural pixels of the array of output pixels, information indicating whether all of the sample positions for that set have the same sample value; and use the information to control use of the rendered fragment data stored in the tile buffer; wherein the pipeline is configured to use the information to control use of the rendered fragment data stored in the tile buffer by using the information to control blending of newly generated rendered fragment data with rendered fragment data stored in the tile buffer.

11. The pipeline of claim 10, wherein the pipeline is configured to use the information to control use of the rendered fragment data stored in the tile buffer by:

(i) using the information to control writing out of the rendered fragment data from the tile buffer to the external memory; or (ii) using the information to control compression of the rendered fragment data.

12. The pipeline of claim 10, wherein the pipeline is configured to use the information to control use of the rendered fragment data stored in the tile buffer by:

producing only a single output value for a set of plural pixels when the information indicates that all of the sample positions for that set have the same sample value; and duplicating the single output value in the external memory.

13. The pipeline of claim 10, wherein the pipeline is configured to use the information to control blending of newly generated rendered fragment data with rendered fragment data stored in the tile buffer by:

determining, using the information, whether all of the sample positions for a set have the same sample value; and when it is determined, using the information, that all of the sample positions for a set have the same sample value, producing only a single blended sample value for all of the sample positions within the set.

14. The pipeline of claim 10, wherein each set of plural pixels corresponds to a variable rate shading (VRS) coarse pixel, and the information is indicative of whether all of the sample positions corresponding to a variable rate shading (VRS) coarse pixel have the same sample value; and
the pipeline is configured to use the information to control blending of newly generated rendered fragment data with rendered fragment data stored in the tile buffer by:
determining, using the information, whether all of the sample positions that correspond to a variable rate shading (VRS) coarse pixel have the same sample value; and
when it is determined, using the information, that all of the sample positions that correspond to a variable rate shading (VRS) coarse pixel have the same sample value, producing a single blended sample value for the variable rate shading (VRS) coarse pixel.

15. The pipeline of claim 10, wherein the information indicates:
for each set, either that (i) all of the sample positions within the set have the same sample value, or that (ii) fewer than all of the sample positions within the set have the same sample value; or
either (i) that for each set of plural pixels within a superset, all of the sample positions within that set have the same sample value, or (ii) that fewer than all of the sample positions within at least one set of the superset have the same sample value.

16. The pipeline of claim 15, wherein each superset corresponds to a first variable rate shading (VRS) coarse pixel, and each set corresponds to a second variable rate shading (VRS) coarse pixel of plural second variable rate shading (VRS) coarse pixels that the first variable rate shading (VRS) coarse pixel is divided into, and wherein the information indicates that: (i) all of the sample positions within the first coarse pixel have the same sample value; or (ii) for each second coarse pixel, all of the sample positions within that second coarse pixel have the same sample value; or (iii) fewer than all of the sample positions within at least one of the second coarse pixels have the same sample value.

17. The pipeline of claim 10, wherein:
the output array is divided into sets of plural pixels at multiple levels, where at each level the output array is divided into sets of plural pixels with progressively larger sizes, and where the information indicates whether all of the sample positions for each set of pixels have the same sample value for each of the multiple levels; and
the pipeline is configured to use the information to control use of the rendered fragment data stored in the tile buffer by:
using the information to determine a largest set of plural pixels for which all of the sample positions within that set have the same sample value; and
controlling the use of the rendered fragment data stored in the tile buffer based on the determination.

18. A graphics processor configured to execute the graphics processing pipeline of claim 10.

19. A non-transitory computer readable storage medium storing software code which when executing on a processor performs a method of operating a tile-based graphics processing pipeline that comprises:
a plurality of processing stages, including at least a rasteriser that rasterises input primitives to generate graphics fragments to be processed, and a renderer that processes fragments generated by the rasteriser to generate rendered fragment data; and
a tile buffer configured to store rendered fragment data locally to the graphics processing pipeline prior to that data being written out to an external memory, wherein the tile buffer is configured to store rendered fragment data for an array of sample positions, with each sample position of the array of sample positions having a sample value associated with it, and each sample position or group of sample positions of the array of sample positions corresponding to an output pixel of an array of output pixels;
the method comprising:
maintaining, in association with the tile buffer, in respect of one or more sets of plural pixels of the array of output pixels, information indicating whether all of the sample positions for that set have the same sample value; and
using the information to control use of the rendered fragment data stored in the tile buffer; wherein using the information to control use of the rendered fragment data stored in the tile buffer comprises using the information to control blending of newly generated rendered fragment data with rendered fragment data stored in the tile buffer.

* * * * *